United States Patent [19]

Nomden et al.

[11] Patent Number: 4,946,750

[45] Date of Patent: Aug. 7, 1990

[54] PROCESS FOR GENERATING ELECTRICITY

[75] Inventors: Jan F. Nomden; Paul F. Van Den Oosterkamp, both of Zoetermeer, Netherlands

[73] Assignee: KTI Group B.V., Netherlands

[21] Appl. No.: 411,924

[22] Filed: Sep. 25, 1989

[30] Foreign Application Priority Data

Sep. 26, 1988 [NL] Netherlands .................. 8802357

[51] Int. Cl.$^5$ ............................................... H01M 8/04
[52] U.S. Cl. ........................................ 429/17; 429/19; 429/20
[58] Field of Search ................. 429/17, 13, 20, 19

[56] References Cited

U.S. PATENT DOCUMENTS

| | | | |
|---|---|---|---|
| 4,310,604 | 1/1982 | Marchetti | 429/17 |
| 4,532,192 | 7/1985 | Baker et al. | 429/17 X |
| 4,696,871 | 9/1987 | Pinto | 429/17 |
| 4,738,903 | 4/1988 | Garow et al. | 429/17 |

*Primary Examiner*—Anthony Skapars
*Attorney, Agent, or Firm*—Michael N. Meller

[57] ABSTRACT

The invention is directed to a process for generating electricity from a fuel on the basis of one or more hydrocarbons, which comprises
catalytically converting said fuel into a CO and H$_2$ containing gas,
supplying the resulting gas to at least one shift reactor, in which at least part of the CO present is converted into H$_2$ to form a H$_2$ containing gas,
supplying the H$_2$ containing gas to the anode spaces of at least one fuel cell unit, the difference between the operating temperature of the fuel cell unit and the temperature of the gas supplied to the shift reactor being not more than 50° C.,
using a fuel cell unit having an operating temperature of at least 125° C., and
maintaining the temperature of the fuel cell unit to form process steam, which process steam is also used to heat the feeds to the fuel cell.

20 Claims, 1 Drawing Sheet

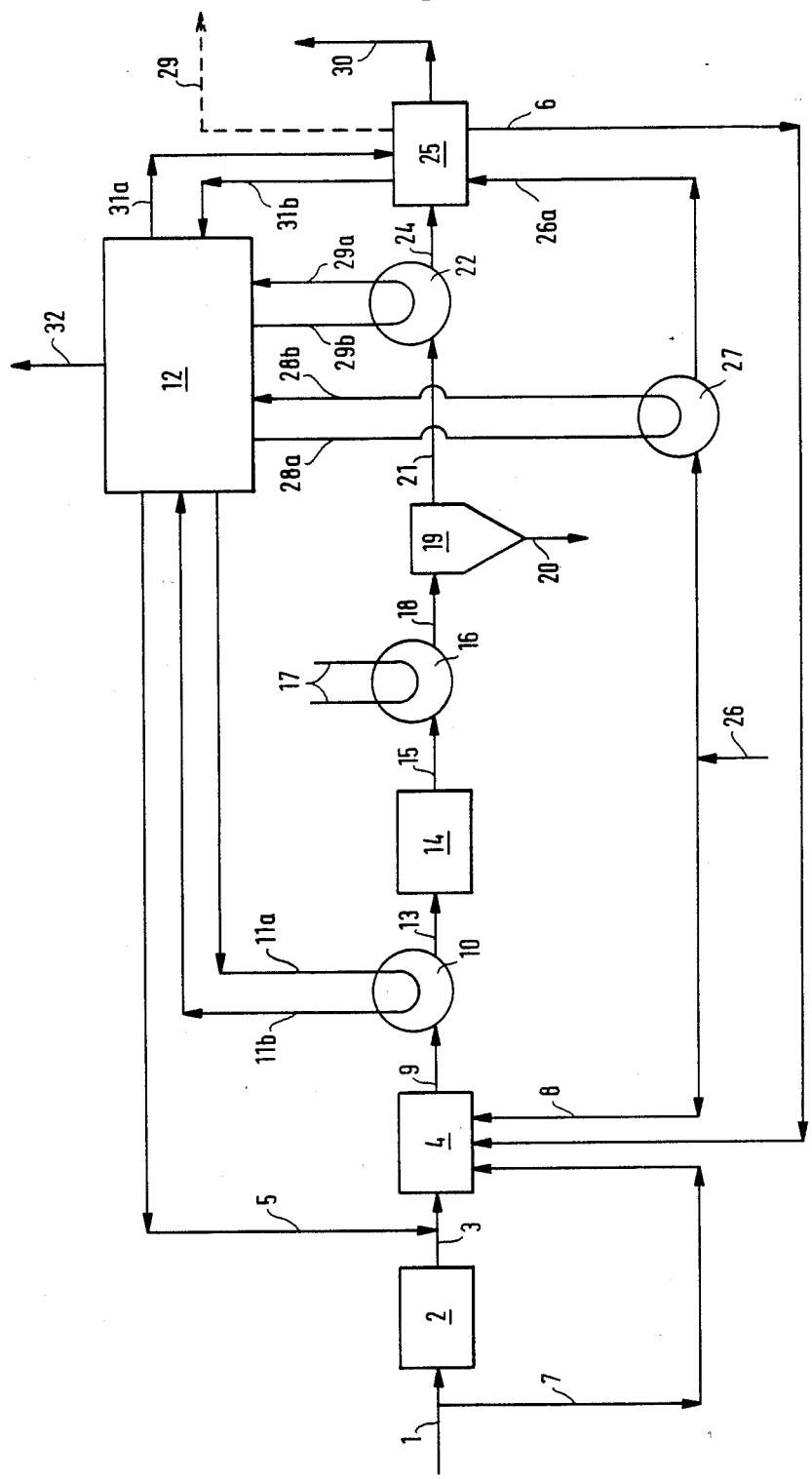

PROCESS FOR GENERATING ELECTRICITY

This invention relates to a process for generating electricity using a fuel cell system.

For generating electricity from fossil fuels or fuels on the basis of other hydrocarbons it is conventional in general to make use of electric power stations, in which the fuel, such as oil or natural gas, is combusted to drive gas turbines and/or steam turbines, which, in turn, are connected to electricity generators.

One important disadvantage of such systems resides in their relatively low electrical efficiency, Attempts have been made to remove this disadvantage by using systems having a higher efficiency, such as fuel cell systems. In such systems fossil or other fuel can be converted in a $H_2$ producing unit into a $H_2$ containing gas, which gas, if desired after further purification, is supplied to the anode space of a fuel cell unit. Such systems are already known, and many researches are still being made to improve these systems.

The use of such systems has a number of advantages. In the first place, the efficiency of the fuel cells is high, especially when the various parts of the system are suitably integrated. In such a case, the efficiency of the total plant may even be higher than the efficiency of the fuel cell. In the second place, there is obtained an electricity production with a low emission of harmful substances, and in the third place the "partial-load characteristics" are good, which means that even at lower loads a good efficiency is obtained. Finally, there is also the advantage that a modular construction is possible.

Plants based on fuel cells generally comprise a pretreatment of the fuel (desulfurization, preheating), a conversion of the fuel into a gas containing $H_2$ and CO by steam reforming, followed by a shift reaction for further converting CO into $H_2$. After removal of impurities, if any, the gas is suitable for use in a fuel cell.

This gas is supplied to the anode spaces of the fuel cell unit, while an $O_2$ containing gas is supplied to the cathode spaces of the same unit. In the fuel cell electricity and heat are generated, the electricity then being generally converted into alternating current to be used in the power network. The heat must be discharged to prevent the cell from becoming too hot.

Various types of fuel cells are known, in which the difference especially resides in the type of electrolyte used. These electrolytes are largely described in the literature and comprise, among others, phosphoric acid, molten carbonate, alkaline electrolytes solid oxides and solid polymers.

The report of E. R. Elzinga et al, EPRI EM-384, January 1977, EXXON Enterprises, "Application of the Alsthom/Exxon alkaline fuel cell system to utility power generation", pages A2-4, and pages 3-4 to 3-6, contains an explanation of the use of alkaline fuel cells for the generation of current.

In order to obtain a sufficiently high efficiency, a substantial integration of the various process streams is used in the present systems. This means, however, that in case of breakdowns in one or more parts of the plant, or in case of interruption of the current demand, the entire plant must often be stopped. Of course, it is possible to avoid these problems by using a clearly less strong integration. However, this has the disadvantage of a reduced efficiency.

When using fuel cell systems it is important, on the one hand, to have a good heat recovery available, while, on the other hand, a good stabilization of the entire system and a good control are desirable.

It is an object of the invention to provide a process for generating electricity from a fuel on the basis of one or more hydrocarbons using a fuel cell system in which a substantial integration is applied, but in which the problems connected therewith do not occur or occur to a much lesser extent, while moreover a simple and properly controllable plant is obtained.

This invention therefore relates to a process for generating electricity from a fuel on the basis of one or more hydrocarbons, which comprises catalytically converting said fuel into a CO and $H_2$ containing gas, supplying the resulting gas to at least one shift reactor, in which at least part of the CO present is converted into $H_2$ to form a $H_2$ containing gas, supplying the $H_2$ containing gas to the anode spaces of at least one fuel cell unit, the difference between the operating temperature of the fuel cell unit and the temperature of the gas supplied to the shift reactor being not more than 50° C., using a fuel cell unit having an operating temperature of at least 125° C., and maintaining the temperature of the fuel cell unit to form process steam, which process stream is also used to heat the feeds to the fuel cell.

The use of the given temperature regime and the integration of maintaining the fuel cell unit at operating temperature with heating the feeds to the fuel cell unit render it possible according to the invention to effect a substantial integration of the various steps of the process.

According to a preferred embodiment of the invention there is used an integrated steam system for supplying and discharging heat to and from the various parts of the process and more in particular the steam production on the basis of the heat produced in the shift reactor and the fuel cell unit. According to the invention there is preferably started from one and the same integrated steam system for the $H_2$ production units and for the fuel cell unit, which means, among others, that for all these units the steam system functions at the same pressure and temperature.

The steps according to the preferred embodiment of the process according to the invention offer the possibility of realizing optimum integration of the various parts of the process without the attendant disadvantages to be expected in the case of a substantial integration. In practice, it has proved difficult to have the known fuel cell processor operate without breakdowns for a long period of time. Problems occurring therewith were the result of the integration, in which deviations in a certain process step caused a breakdown in another process step.

It has now been found that as a result of the integration according to the invention in which the entire plant is integrated via a single steam system which preferably supplies more steam than is required for operating the plant the possibilities of compensating deviations and breakdowns are much greater so that a deviation or breakdown does not immediately result in a shutdown of the entire plant. Since the temperature of the steam system can easily be maintained, if required together with a start-up heater to be fired with fuel supplied from outside, the operating temperature of the shift reactor and the fuel cell can also be maintained in case of a shutdown, which strongly simplifies a later start-up.

Also in case of a start-up of the plant the process according to the invention has many advantages, because the use of the integration by means of the temperature of the various parts facilitates preheating to the operating temperature, after which there can be started up rapidly and efficiently.

The process according to the invention comprises in essence four different steps. The first step comprises the conversion of the fuel to be used, which may be pretreated, in the presence of steam in a mixture comprising $H_2$, $CO$, $CO_2$, $H_2O$, $CH_4$ and further gaseious compounds. Depending on the type of fuel, it may be necessary to use a pretreatment. This may be necessary to protect the catalysts from poisoning or damage, or to provide optimum process conditions. Examples of such pretreatments are desulfurization, heat exchange, filtration etc.

Depending on the type of fuel to be used, the temperature of the steam reforming reaction may vary from 250° to 1000° C. Alkanols, such as ethanol, require lower temperatures than hydrocarbons, such as naphta and natural gas. For naphta and natural gas conventional temperatures range from about 600° to 1000° C. The use of the latter temperatures if preferred. For steam reforming conventional pressures range from 1 to 50 bar.

The gas obtained in this first step is supplied to the second step, the shift reaction, where in the presence of steam at least part of the CO present is converted further. This reaction takes place in the presence of a catalyst. In practice, different types of catalysts can be used. The selection is at least partly determined by the temperature to be used in this step. In general, this temperature ranges from 150° to 500° C.

Suitable catalysts can be based on Cu/Zn or on Fe/Cr. These catalysts are preferably applied to an inert carrier material. In this connection it is observed that the shift reaction is an exothermic reaction so that the operating temperature of the reactor is in general higher than the temperature of the inlet, i.e. of the gas supplied to the reactor.

In the third process step a heat exchange takes place between various process streams. In view of the connection with the other process steps this will be discussed after the discussion with respect to the fourth process step.

The fourth process step is formed by the fuel cell unit. This unit is composed of known per se fuel cells combined to a unit (stack). It is essential that the operating temperature of the cell should be at at least 125° C., because otherwise the advantages of the process according to the invention are obtained to an insufficient extent. The upper limit of the temperature is 500° C., preferably 400° C., because higher temperatures offer no additional advantages. A type of fuel cell eminently suited for use in the process according to the invention is the fuel cell based on phosphoric acid. This cell operates at a temperature of 150°-200° C., preferably at 180° C. In the fuel cell hydrogen is converted with oxygen into electric power and heat. This heat must be discharged to maintain the temperature at the proper value. In principle, this is done by means of asteam system in which the pressure is so chosen that the steam temperature is sufficiently far below the operating temperature of the cell to discharge the excess heat. A suitable temperature difference is maximally 50° C., preferably 5°-25° C. By way of example, it can be indicated that at a fuel cell temperature of 180° C. a steam temperature of 170° C. can be suitably used, which corresponds to a steam pressure of 8 bar.

It is further observed that the use of fuel cells on the basis of alkaline electrolytes is not preferred, because owing to their low operating temperature the possibilities of integration are too small in general.

After preheating the hydrogen-containing gas is supplied in the third step to the anode spaces, while after preheating the oxygen-containing gas is supplied to the cathode spaces. In general, no complete conversion occurs in the fuel cell so that two residual gasses are obtained. The hydrogen-containing gas comprises, in general, 5-45% of the original amount of hydrogen. This residual gas is advantageously used as a fuel for the steam reforming step.

The conversion of oxygen will generally be lower than the conversion of hydrogen. Since air is mostly used for this purpose, the residual gas is blown off, if required after heat recovery.

The gas from the shift reactor is treated in the third step of the process according to the invention in order to obtain an optimum a feed gas for the fuel cell unit. A maximum use of heat exchange leads to a highest possible efficiency and at the same time a proper temperature control of the different process steps.

The operating temperature of the shift reactor is chosen at a value near the operating temperature of the fuel cell. Preferably, the temperature of the shift reactor is slightly above the temperature of the fuel cell. The feed gas from the steam reforming is too hot to be immediately supplied to the shift reactor and must therefore be cooled to the desired value.

When using the process according to the invention, this is easily done by means of heat exchange in the steam production system, e.g., a steam drum. Excess heat is converted into steam, while there is further obtained an ideal temperature control for the shift reactor inlet temperature.

The hydrogen-rich gas stream from the shift reactor is to be cooled first before condensing and separating excess steam and impurities, if any. The gas becomes available at a temperature of about 25°-75° C. and is to be preheated to about 150°-250° C. The oxygen-containing gas is also to be heated to this temperature. This is easily done by means of the steam generated in the system, e.g., through condensation of steam.

Waste heat from the fuel cell is also converted into steam. A heat balance of the steam system indicates that the production of steam is amply sufficient for the requirements of the entire plant, which means that it is possible to maintain the complete system in a stable condition by blowing off steam, whereby the order of proceedings is further improved and simplified. Before the steam is blown off, it can be used for degassing boiler feed water.

BRIEF DESCRIPTION OF THE DRAWINGS

The invention will hereinbelow be illustrated with reference to the accompanying FIGURE showing a block diagram of an embodiment of the process according to the invention.

A hydrocarbon-based fuel is supplied through line 1 to the desulfurizer 2. The desulfurized fuel is supplied through line 3 to steam reformer 4, after the fuel has been mixed up with steam supplied through line 5. Through line 6, fuel (fuel gas) is supplied for the steam reforming, which fuel comes from a later part of the process. If desired, additional fuel may be supplied through line 7 to steam reformer 4. An $O_2$ containing gas is supplied through line 8 for the combustion. The $H_2$ and CO containing gas produced is supplied through line 9 to heat exchanger 10 in which the gas is cooled to the desired value by means of heat exchange medium supplied and discharged through lines 11a and 11b. In steam drum 12 this heat is converted into steam.

The thus cooled gas is supplied through line 13 to shift reactor 14. In this reactor a large part of the CO present in the gas is converted with the steam already present in the gas into hydrogen. The gas is supplied through line 15 to heat exchanger 16, in which it is cooled by means of cooling water supplied and discharged through line 17. Through line 18, the gas is supplied to knock-out drum 19, in which the condensed impurities and water are separated and are discharged through line 20.

Through line 21, the thus purified and dried gas is supplied to heat exchanger 22, in which it is heated by means of condensing steam supplied through line 23a. The condensate is returned through line 23b to steam drum 12. Through line 24, the $H_2$ containing gas is then supplied to the anode spaces of the fuel cell unit 25.

Through lines 26 and 26a, an oxygen containing gas, such as air, is supplied to the cathode spaces of the fuel cell unit 25. In line 26a there is provided a heat exchanger 27, in which the gas is heated with condensing steam in a manner comparable to the manner described for heat exchanger 22. The supply and discharge of steam or condensate takes place through lines 28a and 28b.

The above described configuration is based on the use of separate heat exchangers 22 and 27. It is also possible, however, to carry out the heat exchange in the steam drum 12.

In the fuel cell unit 25 electricity is produced which is discharged through line 29. Through line 30, the residual gas still containing $O_2$ is drained off. The residual gas still containing $H_2$ is returned through line 6 as fuel gas to the steam reformer 4.

Through line 31a water is supplied to fuel cell unit 25 which takes up the excess heat, and which is returned through line 31b to steam drum 12 in which steam is produced.

The cooling circuit for the fuel cell unit 25 may form part of one integrated steam system, but it may also be advantageous to use a closed cooling circuit for the discharge of heat from the fuel cell unit. In that case heat is discharged from the fuel cell unit by means of a liquid, such as water, or another heat transfer liquid, which heat can be transferred to other process streams through heat exchange, while the excess is converted into process steam.

The excess of steam produced is blown off through line 32, which measure also serves to control the temperature in the entire system.

The invention will hereinbelow be explained by the following example, which example is only meant as an illustration.

EXAMPLE

To a plant as shown in the figure and provided with a fuel cell on the basis of phosphoric acid, 100 kmoles/h of natural gas (Slochteren gas) was supplied with an energy content of 38,474.0 kJ/kg. A steam/carbon ratio of 3.3 was used in the feed of the steam reformer at a temperature of 730° C. and a pressure of 1.3 bar. The methane slip was 0.44% (dry).

The resulting $H_2$ and CO containig gas was cooled to a temperature of 200° C. and supplied to the shift reactor, which was operated at a temperature of about 250° C. The heat discharged was used to produce steam having a pressure of 8 bar and a temperature of 170° C.

The gas produced in the shift reactor was cooled, the condensed materials were separated, and the resulting gas containing 345.5 kmoles/h $H_2$ was heated to a temperature of 160° C. by means of condensing steam, after which it was supplied to the fuel cell unit, which had an operating temperature of 180° C. The direct electricity production was 8.8 MW, while 8.7 MW low pressure steam was generated which was used elsewhere in the system.

About 80% of the $H_2$ supplied was converted. The residual gas was supplied together with natural gas to the steam reformer. This steam reformer used 6.9 MW, 5.2 MW of which was taken up, which corresponds to an efficiency of 75%.

The overall power supply to the plant was 21.6 MW. Taking into account the energy requirement of the plant, the efficiency was about 39%, calculated as the ratio of the amount of alternating current produced to the "lower heating value" of the feed (x 100%).

What we claim is:

1. A process for generating electricity from a fuel on the basis of one or more hydrocarbons, which comprises
   catalytically converting said fuel into a CO and $H_2$ containing gas,
   supplying the resulting gas to at least one shift reactor, in which at least part of the CO present is converted into $H_2$ to form a $H_2$ containing gas,
   supplying the $H_2$ containing gas to the anode spaces of at least one fuel cell unit, the difference between the operating temperature of the fuel cell unit and the temperature of the gas supplied to the shift reactor being not more than 50° C.,
   using a fuel cell unit having an operating temperature of at least 125° C., and
   maintaining the temperature of the fuel cell unit to form process steam, which process steam is also used to heat the feeds to the fuel cell.

2. A process according to claim 1, in which the $H_2$ and CO containing gas is cooled to the operating temperature of the shift reactor to form process steam.

3. A process according to claim 1 in which the forming of the process steam by cooling the $H_2$ and CO containing gas and by maintaining the operating temperature of the fuel cell unit is effected in one and the same integrated steam system.

4. A process according to claims 1, in which other process streams are heated using the excess heat produced.

5. A process according to claims 1, in which the $H_2$ containing gas is cooled to condense the greater part of the impurities.

6. A process according to claims 1, in which the starting fuel is natural gas, LPG, naphta, biogas, gas from household refuse, and lower alkanols.

7. A process according to claims 1, in which a fuel cell unit is used having an operating temperature ranging between 125° and 500° C.

8. A process according to claims 1, in which a fuel cell unit on the basis of phosphoric acid is used.

9. A process according to claims 1, in which the difference between the operating temperature of the steam system and the operating temperature of the fuel cell unit is not more than 50° C.

10. A process according to claim 9, in which the difference ranges between 5 and 25° C.

11. A process according to claims 1, in which said catalytic conversion of the CO and $H_2$ containing gas is carried out at a temperature ranging between 600° and 1000° C.

12. A process according to claim 2, in which the forming of the process steam by cooling the $H_2$ and CO containing gas and by maintaining the operating temperature of the fuel cell unit is effected in one and the same integrated steam system.

13. A process according to claim 2, in which the other process streams are heated using the excess heat produced.

14. A process according to claim 3, in which other process streams are heated using the excess heat produced.

15. A process according to claim 2, in which the $H_2$ containing gas is cooled to condense the greater part of the impurities.

16. A process according to claim 3, in which the $H_2$ containing gas is cooled to condense the greater part of the impurities.

17. A process according to claim 4, in which the $H_2$ containing gas is cooled to condense the greater part of the impurities.

18. A process according to claim 2, in which said catalytic conversion of the CO and $H_2$ containing gas is carried out at a temperature ranging between 600° and 1000° C.

19. A process according to claim 3, in which said catalytic conversion of the CO and $H_2$ containing gas is carried out at a temperature ranging between 600° and 1000° C.

20. A process according to claim 4, in which said catalytic conversion of the CO and $H_2$ containing gas is carried out at a temperature ranging between 600° and 1000° C.

* * * * *